United States Patent
Herschbach et al.

(10) Patent No.: US 7,279,125 B2
(45) Date of Patent: Oct. 9, 2007

(54) TAKE-OFF UNIT

(75) Inventors: Christof Herschbach, Muenster (DE); Gerd Kasselmann, Hagen (DE); Holger Frische, Hasbergen (DE)

(73) Assignee: Windmoeller & Hoelscher KG, Lengerich (DE)

( * ) Notice: Subject to any disclaimer, the term of this patent is extended or adjusted under 35 U.S.C. 154(b) by 0 days.

(21) Appl. No.: 10/542,403

(22) PCT Filed: Dec. 19, 2003

(86) PCT No.: PCT/EP03/14560

§ 371 (c)(1), (2), (4) Date: Jul. 15, 2005

(87) PCT Pub. No.: WO2004/062882

PCT Pub. Date: Jul. 29, 2004

(65) Prior Publication Data

US 2006/0034969 A1    Feb. 16, 2006

(30) Foreign Application Priority Data

Jan. 15, 2003    (DE) .............................. 103 01 321

(51) Int. Cl.
B29C 47/34    (2006.01)
B65H 23/32    (2006.01)
(52) U.S. Cl. ............... 264/230; 264/342 R; 425/436 R
(58) Field of Classification Search ............ 425/436 R; 264/342 R, 342 RE, 230
See application file for complete search history.

(56) References Cited

U.S. PATENT DOCUMENTS

| 3,679,116 | A | * | 7/1972 | Hamlin et al. | ......... 242/615.12 |
|---|---|---|---|---|---|
| 3,744,693 | A | | 7/1973 | Greiner | .................. 242/615.12 |
| 4,106,799 | A | * | 8/1978 | Oetiker | ....................... 285/365 |
| 4,138,047 | A | * | 2/1979 | Sherman | ........................ 226/7 |
| 4,277,010 | A | * | 7/1981 | Landskroener et al. | ....... 226/95 |
| 5,452,834 | A | * | 9/1995 | Mariotti et al. | ......... 242/615.12 |
| 5,674,540 | A | | 10/1997 | Sensen et al. | .............. 425/72.1 |
| 5,827,166 | A | * | 10/1998 | Cestonaro et al. | ........... 493/344 |
| 5,979,731 | A | * | 11/1999 | Long et al. | ...................... 226/7 |
| 6,004,432 | A | * | 12/1999 | Page et al. | ................... 162/281 |
| 6,398,534 | B1 | * | 6/2002 | Faehling et al. | ............ 425/72.1 |
| 2002/0142064 | A1 | * | 10/2002 | Gandelheidt | ................ 425/445 |

FOREIGN PATENT DOCUMENTS

| DE | 41 39 837 A1 | 6/1993 |
|---|---|---|
| DE | 94 18 255 U1 | 3/1996 |
| DE | 44 40 647 A1 | 5/1996 |
| DE | 195 22 318 A1 | 1/1997 |
| EP | 0 658 506 A1 | 6/1995 |
| EP | 0 749 823 A1 | 12/1996 |
| GB | 2 262 087 A | 6/1993 |
| JP | 61 061 828 | 3/1986 |
| JP | 07 053102 A | 2/1995 |

* cited by examiner

Primary Examiner—Yogendra N. Gupta
Assistant Examiner—Emmanuel S. Luk
(74) Attorney, Agent, or Firm—Jacobson Holman PLLC

(57) ABSTRACT

A withdrawal device for blow-molded film has an air turning bar with an air cushioned surface for transporting the film, and the bar surface includes at least in part a sintered material. The sintered material portion of the bar surface provides a region of increased friction for compressed air flow, thus more effectively guiding the withdrawn film in a flat and even form.

6 Claims, No Drawings

TAKE-OFF UNIT

This is a nationalization of PCT/EP03/014560 filed Dec. 19, 2003 and published in German.

BACKGROUND OF THE INVENTION

1. Field of the Invention

The present invention relates to a withdrawal device for films manufactured in a blow-molding process.

2. Description of the Prior Art

A withdrawal device for films manufactured in the blow-molding process is known, for instance from the patent specification DE 195 22 318 A1. After the film, for instance, a plastic tubular film emerging from an extruder has been laid flat, it is guided by means of air turning bars and deflecting rollers that as a rule reverse against one another and usually rotate around a common axis. After running through the withdrawal device the film is fed to a winding device on which it is wound into a roll for the purpose of collecting it and transporting it away easily.

The air turning bars used in withdrawal devices of such type were frequently executed in a way allowing compressed air to flow through them, which can emerge through drilled holes distributed across the casing of the air turning bars, in order for an insulating air cushion to be formed between the surface of the air turning bar and the plastic tubular film drawn over it enabling the film to be guided in an almost contact-free manner. In particular, in processing films that range from adhesive to sticky, it is particularly desirable to carry the film with large insulating air cushions as this causes the film guided over the air turning bar to float on the entire width of the air turning bar.

One problem in the known air turning bars is the uneven thickness of the air cushion over the axial width of the bar and/or the uneven force acting on the film due to the compressed air. Air can escape from the side regions of the film, thus reducing the amount of compressed air in these areas. The side regions of the film wrap around the turning bar more tightly than the center regions of the film. Consequently, in its center region the film exhibits a certain sag and can no longer be guided in a flat form. The film in this center region is prone to the formation of wrinkles.

Therefore an air turning bar is suggested in the patent specification DE 9418255 U1 that is molded in a convex form and thus provides an even web tension over the entire width of the film. The air turning bar introduced there tapers in the direction of its axial side regions. However, it turns out that the films that are guided in this manner cannot be wound up into a perfect roll.

Therefore the patent specification DE 44 40 647 A1 suggests an air turning bar with a concave shape that accommodates the variable thickness of the air cushion while at the same time enabling the film to guide in a flat manner. In the center portion of the air turning bar the film is guided with a greater distance from the turning bar than in the end portions of the turning bar. Due to the lesser distance from the turning bar in the end portions, the forces that are distributed over the width of the film and that act on the film due to the compressed air exhibit lesser variations.

In practice it has been proven even in case of this embodiment of the air turning bar that the air cushion between the turning bar and the film does not apply a sufficiently even force on the film. Consequently the film cannot be guided with an even web tension across its width. In particular, such an air turning bar can be adjusted only to one film width. However, in present times one blowing head of the extruder is used to manufacture films of differing widths.

SUMMARY OF THE INVENTION

It is therefore the purpose of the present invention to create an air turning bar by means of which the stability of the air cushion can be improved.

According to an embodiment of the present invention, a withdrawal device for blow-molded film has an air turning bar with an air cushioned surface for transporting the film, and the bar surface includes at least in part a sintered material. The sintered material portion of the bar surface provides a region of increased friction for compressed air flow, thus more effectively guiding the withdrawn film.

The air turning bar pursuant to the present invention can guide the film smoothly and in a flat and even form. The knowledge underlying the present invention is that air layers directly adjoining rough material experience a high friction and are thus slowed down. Thus the rough texture of sintered material also causes this effect. The rough texture is brought about by fine structures distributed irregularly on the surface of the material. The use of a turning bar that is modified in this manner clearly reduces the increased incidence of the air escaping from the side regions of the film. The air is completely prevented from escaping from the side regions of the film in the case of flat air cushions. It has been seen that due to the reduced air leak it is possible to lower the delivery rate of the pump required for building up the air cushion. This has a positive effect on the energy requirement.

For the purpose of achieving a good distribution of the compressed air below the film while at the same time keeping the manufacturing expenses as low as possible, it is advantageous to manufacture only those sections of the surface that guide the film, at least in part, out of a sintered material.

Thus it is possible to manufacture air turning bars such that only their surface regions guiding the side regions of the film comprise of a sintered material. In the center region of the film the air turning bar can be coated with copper, copper alloy or brass or can comprise of any of these materials. As explained more closely in the patent specification DE 41 39 837 the advantage of the said materials as opposed to the usage of steel involves the reduction in the soiling of the films.

In the case of air turning bars with simple geometric shapes it is advantageous to manufacture them completely out of a sintered material.

In doing so it is particularly advantageous if the sintered material is sintered ceramics.

In addition to the use of air turning bars comprising a sintered material it is advantageous to exploit the favorable properties of an air turning bar that is molded, for instance in a concave form. Therefore a preferred embodiment of the air turning bar according to the invention features a variable radius over an axial expansion thereof.

An advantageous configuration of the air turning bar is explained in the following description.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The air turning bar accordingly consists of a metal pipe that is coated with brass in its side portions. The sections of the air turning bar on which the borders of the film are guided have a surface comprising a sintered material. The surface of a metal pipe thus coated exhibits drilled holes that are distributed according to a definite pattern. Compressed air is pressed through the interior of the pipe that is sealed on one side. The compressed air emerges through the said drilled holes. Due to this an air cushion is formed between the film guided on the air turning bar and the surface of the air turning bar. This air cushion reduces the friction between the film guided by means of the turning bar and the turning bar at least in the region of the drilled holes. In the brass-coated region of the turning bar, hereinafter referred to as a first friction region, the friction still remaining in the contact points is less, firstly due to the low friction between the film and the brass coating, and secondly since the air can be distributed well and evenly over this coating. The coating of sintered material applied in the region of the foil borders, hereinafter referred to as a second friction region, can indeed cause a slightly higher friction between the film and the turning bar. However, this is outweighed by the advantage that even the air experiences a higher friction in the second friction region and hence flows poorly over the second friction region. This combinatory measure considerably improves the functionality of the air turning bar.

The invention being thus described, it will be apparent that the same may be varied in many ways. Such variations are not to be regarded as a departure from the spirit and scope of the invention, and all such modifications as would be recognized by one skilled in the art are intended to be included to be included within the scope of the following claims.

What is claimed is:

1. A withdrawal device for blow-molded film, comprising:
    an air turning bar having an air-cushioned surface for transporting the withdrawn blow-molded film, the bar surface having an edge portion at each end thereof that guides the film, and a central portion disposed between the edge portions,
    said edge portions of the bar surface each including a sintered material having a rough surface texture for providing increased frictional resistance to air flow.

2. The withdrawal device according to claim 1, wherein the central portion of the bar surface includes a non-sintered metal.

3. The withdrawal device according to claim 2, wherein the non-sintered metal is selected from the group consisting of copper and brass.

4. The withdrawal device according to claim 1, wherein the sintered material is a sintered ceramic.

5. A method of withdrawing blow-molded film, comprising:
    supporting the blow-molded film by providing a cushion of compressed air on an air turning bar surface, the bar surface having an edge portion at each end thereof that guides the film, and a central portion disposed between the edge portions; and
    guiding the film by providing a first friction region at the central portion and a second friction region at each of the edge portions, the second friction region having a greater amount of friction than the first friction region.

6. The method according to claim 5, wherein the edge portions of the bar surface each include a sintered material, and the central portion of the bar surface includes a non-sintered metal.

\* \* \* \* \*